(12) United States Patent
Tsuda

(10) Patent No.: US 6,371,179 B1
(45) Date of Patent: Apr. 16, 2002

(54) PNEUMATIC TIRE INCLUDING SHOULDER BLOCKS

(75) Inventor: Satoshi Tsuda, Akashi (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/461,811

(22) Filed: Dec. 16, 1999

(30) Foreign Application Priority Data

Dec. 18, 1998 (JP) .............................. 10-361006

(51) Int. Cl.[7] .................... B60C 11/01; B60C 11/03; B60C 107/00
(52) U.S. Cl. ................................. 152/209.16
(58) Field of Search .................. 152/209.1, 209.18, 152/209.16, 902

(56) References Cited

U.S. PATENT DOCUMENTS

| | | | |
|---|---|---|---|
| 1,505,233 A | * | 8/1924 | Wolfe .................... 152/209.16 |
| 1,956,011 A | | 4/1934 | Evans |
| 3,805,865 A | * | 4/1974 | Price .......................... 152/902 |
| 4,667,718 A | | 5/1987 | Fontaine |
| 5,322,107 A | | 6/1994 | Lagnier |

FOREIGN PATENT DOCUMENTS

BE 413537 1/1936

* cited by examiner

Primary Examiner—Steven D. Maki
(74) Attorney, Agent, or Firm—Birch, Stewart, Kolasch & Birch, LLP

(57) ABSTRACT

A pneumatic tire including a tread portion provided along each tread edge with a circumferential row of shoulder blocks, and each of the shoulder blocks has an axially outer side face which is convexly curved in a plane parallel to the tread surface, whereby the wandering performance of the tire can be improved without causing uneven wear, rubber tear-off, deterioration in running performance and the like.

8 Claims, 4 Drawing Sheets

PNEUMATIC TIRE INCLUDING SHOULDER BLOCKS

BACKGROUND OF THE INVENTION

The present invention relates to a pneumatic tire provided in the tread portion with shoulder blocks capable of improving wandering performance.

In pneumatic tires provided in the tread portion with a rigid belt, such as heavy duty tires for trucks and buses, the rigidity of tread shoulder portions is increased by the belt, and a wondering phenomena tends to occur when running on irregular road surfaces such as rutted road surface.

Hitherto, therefore, in order to improve the wondering performance of a tire, the following means are widely employed: disposing a circumferentially extending narrow groove (a) near each tread edge TE as shown in FIG. 4; disposing axially extending sipes or cuts in each tread edge TE as shown in FIG. 5; and providing tire shoulders (b1) with a round contour as shown in FIG. 6.

The narrow grooves (a) and sipes inevitably decrease the rigidity of the tread edge portions. Therefore, uneven wear is liable to occur. Also, tear-off of tread rubber is liable to occur. In case of the round shoulders (b1), as the ground contacting width decreases and the tread edges are devoid of edged corners, it is difficult to improve running performance such as grip performance during straight running and cornering and the like.

It is therefore, an object of the present invention to provide a pneumatic tire in which the wandering performance can be effectively improved without causing uneven wear, rubber tear-off, deterioration in running performance and the like.

SUMMARY OF THE INVENTION

According to the present invention, the pneumatic tire comprises a tread portion provided along each tread edge with a circumferential row of shoulder blocks, each shoulder block having an axially outer side face which is convexly curved in a plane parallel to the tread surface. The convexly curved axially outer side face extends radially inwardly from the top of the shoulder block to a radial distance which is not less than 60% of the height of the shoulder block.

BRIEF DESCRIPTION OF THE DRAWINGS

An embodiment of the present invention will now be described in detail in conjunction with the accompanying drawings, wherein.

DETAILED DESCRIPTION OF THE INVENTION

Figure 1:
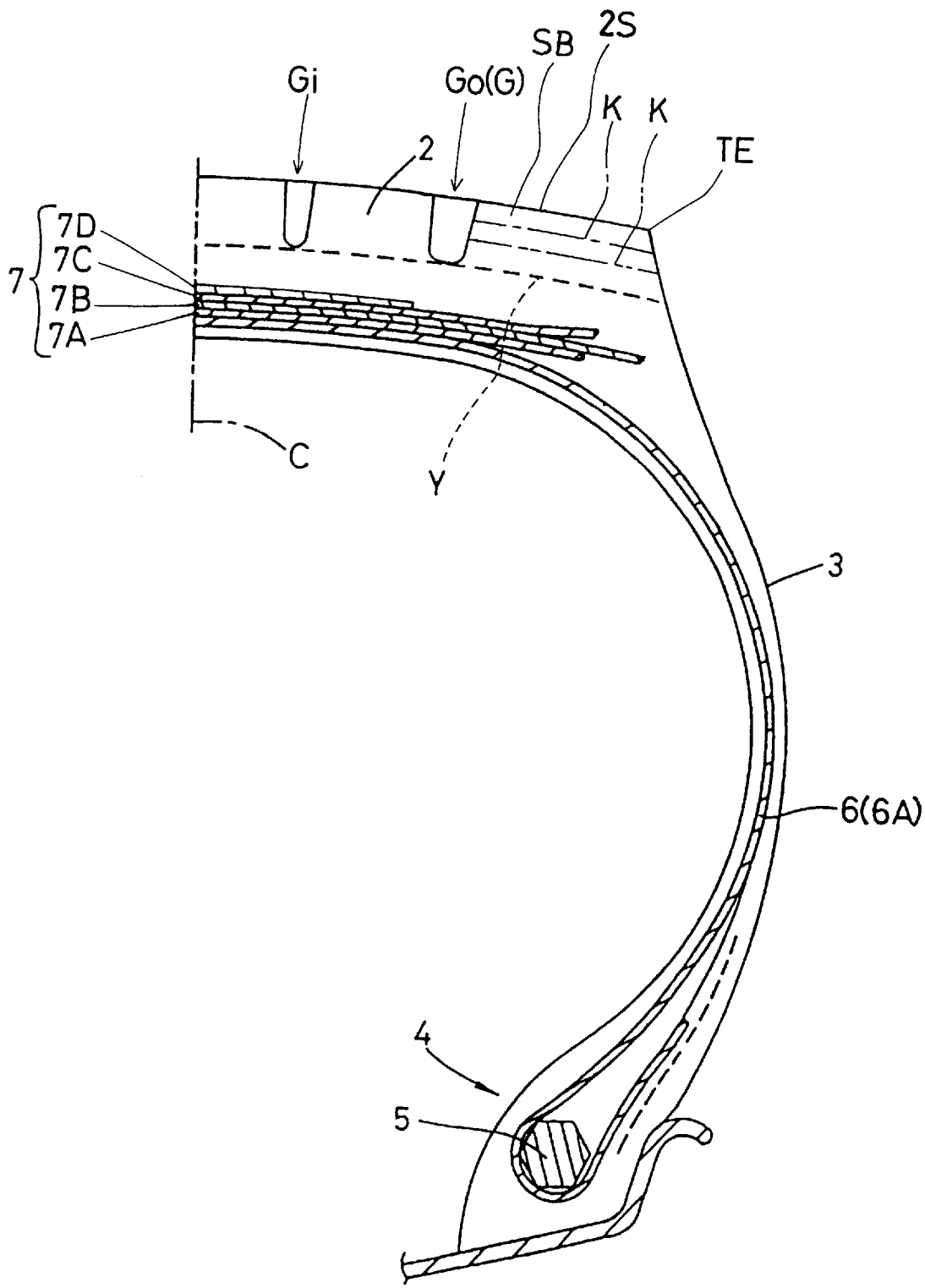
FIG. 1 is a cross sectional view of an embodiment of the present invention.

In the drawings, a pneumatic tire 1 according to the present invention comprises a tread portion 2, a pair of sidewall portions 3, a pair of bead portions 4 with a bead core 5 therein, a carcass 6 extending between the bead portions 4, and a belt 7 disposed radially outside the carcass 6. The tire shoulder is not rounded as shown in FIG. 1 and an edged corner (TE) is formed having an angle of 90 to 120 degrees.

The above-mentioned carcass 6 comprises at least one ply 6A, in this embodiment only one ply, of cords arranged radially at an angle of from 70 to 90 degree with respect to the tire equator C and extending between the bead portions 4 through the tread portion 2 and sidewall portions 3 and turned up around the bead core 5 in each of the bead portions and secured thereto. For the carcass cords, steel cords are used in this example. But organic fiber cords, e.g. polyester, nylon, aromatic polyamide and the like may be used.

The belt comprises a breaker 7 and optionally a band.

The breaker 7 is composed of at least two cross plies of parallel cords. In FIG. 1, the breaker 7 is composed of a radially innermost first ply 7A and second, third and fourth plies 7B, 7C and 7D. In the first ply 7A, the cords are laid at an angle of from 50 to 70 degree with respect to the tire equator C. In each of the plies 7B, 7C and 7D, the cords are laid at an angle of not less than 30 degree. For the breaker cords, steel cords are used in this example. But organic cords, e.g. nylon, polyester, aromatic polyamide and the like may be used.

The band is disposed radially outside the breaker, and the cord angle is very small with respect to the tire circumferential direction, for example, less than 5 degrees.

The tread portion 2 is provided in the ground contacting region 2S with main grooves G extending continuously in the tire circumferential direction.

The main grooves G include two grooves Go disposed one on each side of the tire equator C as the axially outermost main groove, and optionally an axially inner groove Gi disposed therebetween.

The tread portion 2 is further provided in the ground contacting region 2S with lateral grooves Y extending from the outermost main grooves Go to the tread edges TE, whereby a circumferential row of shoulder blocks SB are formed along each tread edge TE.

Figure 2:
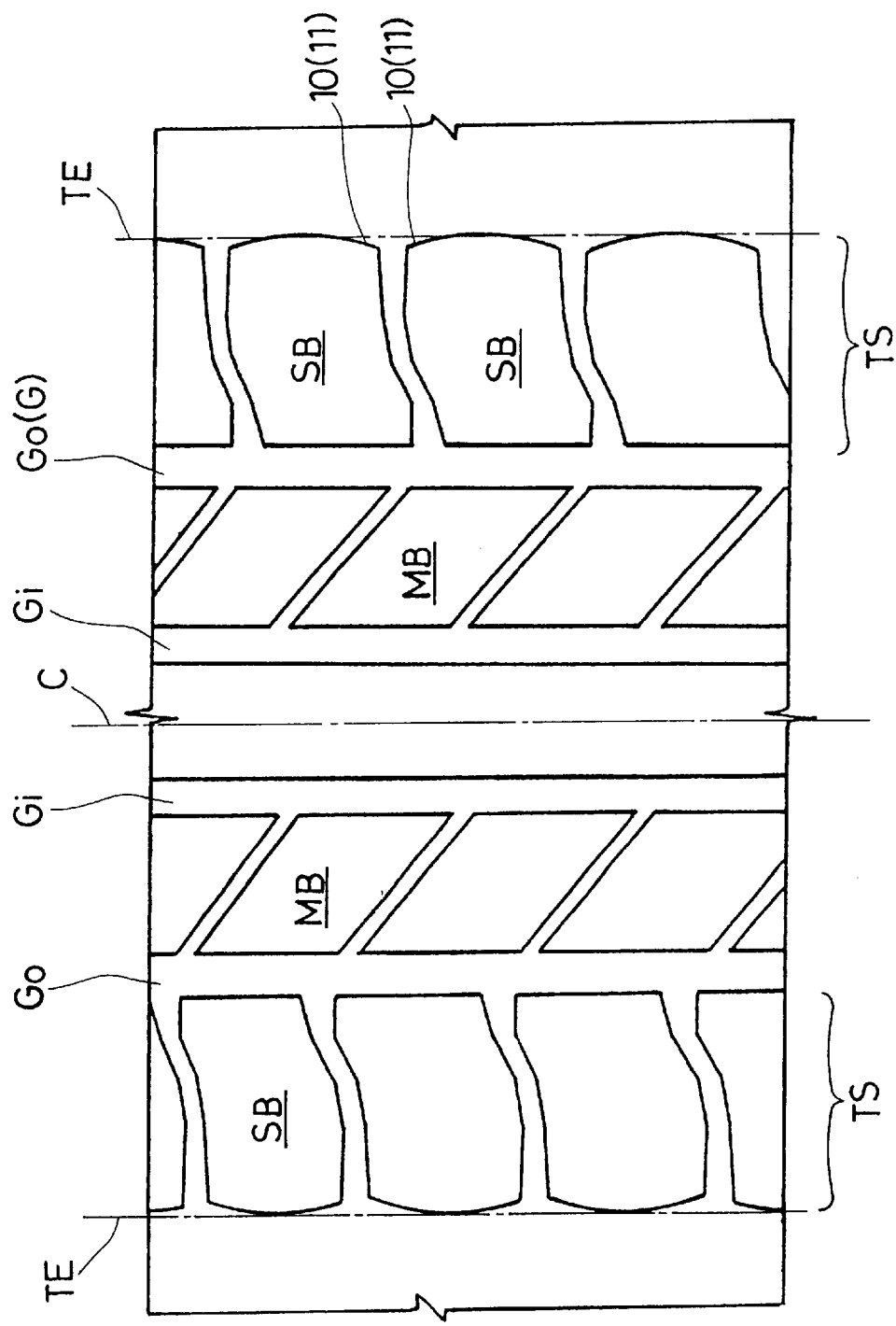
FIG. 2 is a developed view showing an example of the tread pattern.

In an example of the tread pattern shown in FIG. 2, two inner grooves Gi are disposed one on each side of the tire equator C, and further, axially inner lateral grooves extending from the main grooves Go to the main grooves Gi are disposed, wherein the axially inner lateral grooves are straight grooves inclined in one direction. As a result, a circumferentially continuous rib is formed between the two inner grooves Gi, and circumferential rows of middle blocks MB are formed between the inner grooves Gi and outer grooves Go. The tread pattern is bidirectional. As to the inner groove Gi, it is also possible to dispose one inner groove Gi along the tire equator C.

In FIG. 2, the main grooves Go and Gi are straight grooves, but various grooves, e.g. zigzag grooves, wavy grooves and the like may be used. Further, the lateral grooves Y in this example are bent grooves wherein a portion of a certain length from its axially outer end is substantially parallel with the tire axial direction. But various configurations may be also used.

In any case, each of the shoulder blocks SB has an axially outer side face 10, an axially inner side face facing the axially outermost circumferential groove Go, and circumferential side faces facing the lateral grooves Y.

Figure 3:
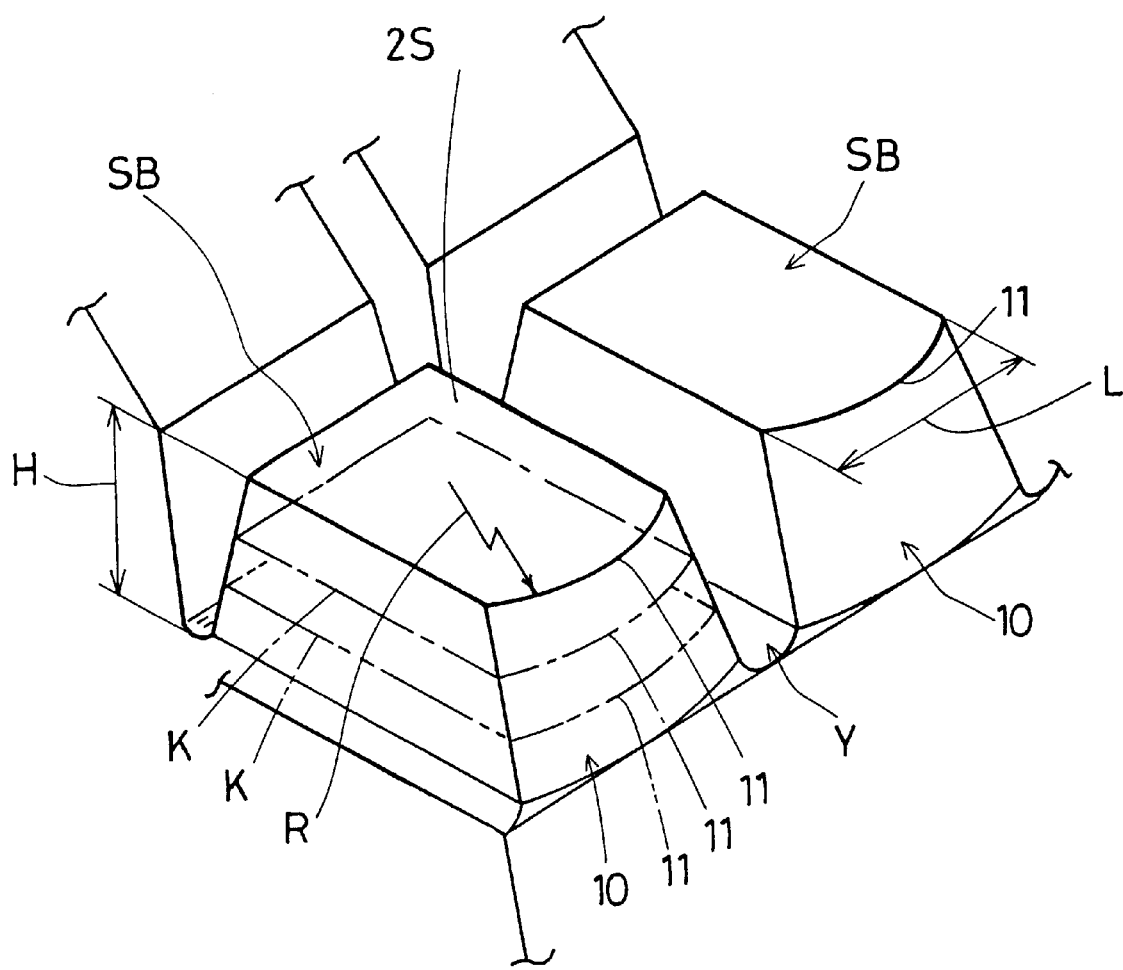
FIG. 3 is a perspective view showing the shoulder blocks thereof.

The axially outer side face 10 is convexly curved in an arc shape 11 in any plane K within a predetermined radial height range, wherein the plane K is defined as being parallel with the tread surface, and the radial height range is defined as extending radially inwardly from the top of the shoulder block SB to a certain distance which distance is at least 60%, preferably more than 80%, more preferably 100% of the radial height H of the shoulder block SB. In this embodiment, as shown in FIG. 3, the curved portion extends from the top to the bottom of the block SB (namely 100% of the radial height H).

In this example, the arc shape 11 has a single radius R, and the radius R increases radially inwardly from a minimum Rmin at the block top to a maximum Rmax at the radially inner end of the above-mentioned radial height range (in this example, the block bottom). Preferably, the minimum radius Rmin is set in the range of from 0.5 to 1.4 times the circumferential length L of the arc 1 at the block top. Preferably, the circumferential length L is set in the range of from 10 to 30%, usually 15 to 25% of the tread width between the tread edges TE.

Apart from a single-radius curve, various convex curves, for example, elliptical curve, multi-radius curve and the like may be used for the arc shape 11. In this case, it is possible to increase the size of the curve, while maintaining a relationship of similar figures, from the block top to the radially inner end of the above-mentioned radial height range.

Incidentally, in a meridian section of the tire, the contour of the tread portion is defined by a substantially single-radius arc, and intersects the contour of upper sidewall portion at the tread edges TE. The intersecting angle is in the range of from 90 to 120 degrees. The contour of the upper sidewall portion is substantially straight from the tread edges TE to the bottom of the shoulder blocks at least.

Comparison Test

Test tires of size 11R22.5-14P (truck/bus radial tires) having the same structure shown in FIG. 1 and FIG. 2 except for the shoulder blocks were made and measured for camber thrust.

The camber thrust was measured with a tire cornering tester under the following conditions. The results are shown in Table 1.

Camber angle: 2 degrees
Wheel rim: 22.5×7.50
Air pressure: 700 kpa
Tire load: 26.72 kN

TABLE 1

Figure 4:
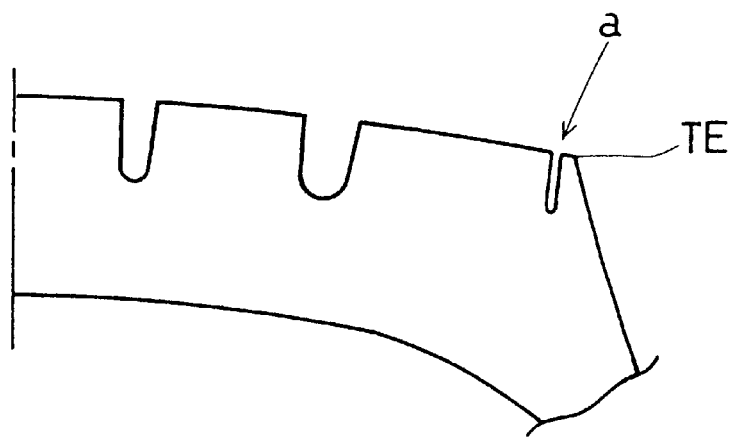
FIGS. 4, 5 and 6 show various tread constructions of the prior art.
Figure 5:
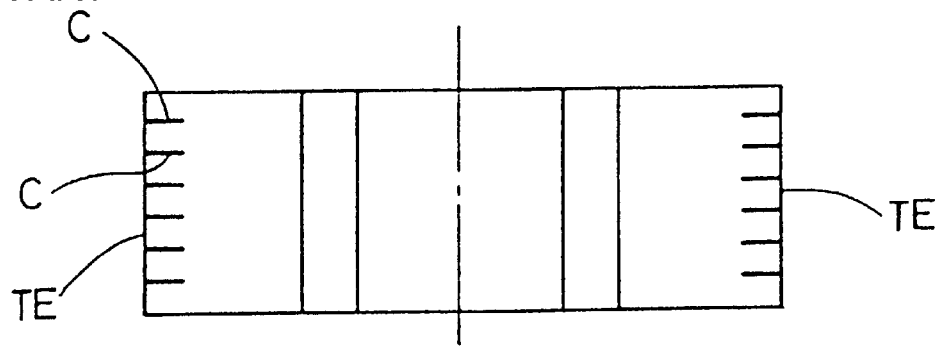
Figure 6:
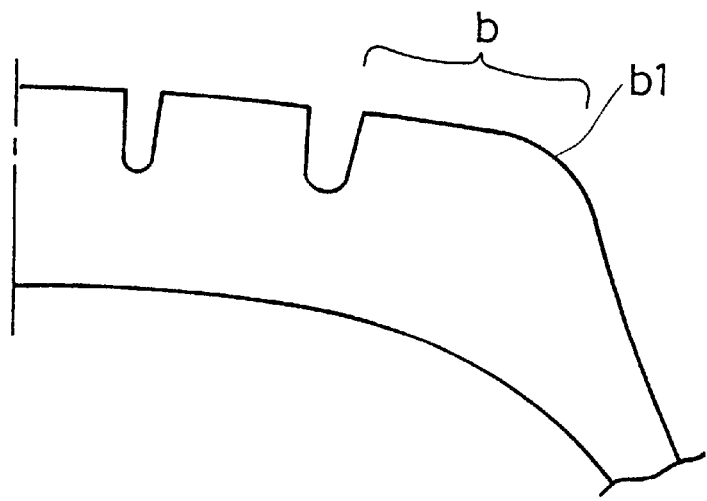

| Tire | Ref. 1 | Ref. 2 | Ex. 1 |
|---|---|---|---|
| Tread pattern | FIG. 2 | FIG. 2 | FIG. 2 |
| Wondering preventing means | none | FIG. 4(A) | FIG. 3 |
| Shoulder block contour | flat | flat | arc |
| Camber thrust (N) | −59 | −38 | −29 |

As explained above, in the pneumatic tire according to the present invention, as the axially outer side faces of the shoulder blocks are curved, it becomes possible to decrease the absolute value of the camber thrust without decreasing the rigidity of the tread shoulder portion, and without rounding the tire shoulder. Therefore, the wandering performance can be effectively improved without causing uneven wear, rubber tear-off, deterioration in running performance and the like.

The present invention is suitably applied to heavy duty tires, but it is also possible to apply to various pneumatic tires for example passenger car tires, light truck tires and the like.

What is claimed is:

1. A pneumatic tire comprising a tread portion with tread edges, the tread portion provided along each of the tread edges with a circumferential row of shoulder blocks, and each of said shoulder blocks having a pair of circumferential side faces defined by lateral grooves, an axially inner side face defined by a circumferential groove and an axially outer side face which is convexly curved in a plane parallel to the tread surface, said plane including at least the top surface of the block, at the top surface of the block, at least one of the axially inner side face and the circumferential side faces being straight, the curvature of the axially outer side face gradually decreasing from said top surface to a radial distance which is not less than 60% of the height of the shoulder block.

2. The pneumatic tire according to claim 1, wherein the curvature of the convexly curved axially outer side face gradually decreases from said top surface to a radial distance which is at least 80% of the height of the shoulder block.

3. The pneumatic tire according to claim 1, wherein the curvature of the convexly curved axially outer side face gradually decreases from said top surface to the bottom of the shoulder block.

4. The pneumatic tire according to claim 1, wherein the curvature of said axially outer side face has a single radius.

5. The pneumatic tire according to claim 4, wherein said single radius increases from the top surface towards the radially inside thereof.

6. The pneumatic tire according to claim 4, wherein at the top surface of the block, said single radius is in the range of from 0.5 to 1.4 times the circumferential length of the axially outer side face.

7. The pneumatic tire according to claim 1, wherein at the top surface of the block, the axially inner side face is straight.

8. The pneumatic tire according to claim 1, wherein at the top surface of the block, the circumferential side faces are straight.

* * * * *